(12) United States Patent
Meier et al.

(10) Patent No.: US 10,362,790 B2
(45) Date of Patent: Jul. 30, 2019

(54) TRANSFER APPARATUS FOR DOUGH PIECES

(71) Applicant: Werner & Pfleiderer Lebensmitteltechnik GmbH, Dinkelsbühl (DE)

(72) Inventors: Alexander Meier, Dürrwangen (DE); Roland Breimann, Neusitz (DE)

(73) Assignee: Werner & Pfleiderer Lebensmitteltechnik GmbH, Dinkelsbühl (DE)

( * ) Notice: Subject to any disclaimer, the term of this patent is extended or adjusted under 35 U.S.C. 154(b) by 0 days.

(21) Appl. No.: 15/898,371

(22) Filed: Feb. 16, 2018

(65) Prior Publication Data

US 2018/0235242 A1    Aug. 23, 2018

(30) Foreign Application Priority Data

Feb. 20, 2017 (DE) .......................... 10 2017 202 706

(51) Int. Cl.
| | |
|---|---|
| *B65G 45/12* | (2006.01) |
| *A21C 9/08* | (2006.01) |
| *A21C 7/00* | (2006.01) |
| *A21C 14/00* | (2006.01) |
| *B65G 45/04* | (2006.01) |
| *A21C 1/08* | (2006.01) |
| *A21C 5/04* | (2006.01) |

(52) U.S. Cl.
CPC ............... *A21C 9/08* (2013.01); *A21C 7/005* (2013.01); *A21C 14/00* (2013.01); *B65G 45/04* (2013.01); *B65G 45/12* (2013.01); *A21C 1/08* (2013.01); *A21C 5/04* (2013.01); *B65G 2201/0202* (2013.01)

(58) Field of Classification Search
None
See application file for complete search history.

(56) References Cited

U.S. PATENT DOCUMENTS

| | | | | |
|---|---|---|---|---|
| 2,642,013 A | * | 6/1953 | Enoch | ....................... A21C 3/04 |
| | | | | 100/222 |
| 3,733,058 A | | 5/1973 | Konig | |
| 3,829,593 A | * | 8/1974 | Hui | .......................... A21B 5/02 |
| | | | | 426/496 |
| 4,212,609 A | * | 7/1980 | Fay | .......................... A21C 9/04 |
| | | | | 425/100 |

(Continued)

FOREIGN PATENT DOCUMENTS

| | | |
|---|---|---|
| DE | 2939818 C2 | 12/1983 |
| DE | 3320210 C2 | 10/1991 |

(Continued)

*Primary Examiner* — Kavel Singh
(74) *Attorney, Agent, or Firm* — Boyle Fredrickson S.C.

(57) ABSTRACT

A transfer apparatus for transferring a dough piece from a first processing station to the next, especially from a dough portioning device to a dough kneading device, includes a rotating dropping roller and a scraper. The rotating dropping roller is configured to release the dough piece from the first processing station. The scraper is associated with the dropping roller and is configured to support the dough piece released from the dropping roller. An oiling device is associated with the dropping roller and is configured to apply oil onto an outside surface of the dropping roller.

14 Claims, 3 Drawing Sheets

(56) References Cited

U.S. PATENT DOCUMENTS 5,496,578 A * 3/1996 Muller ............... A21C 3/04
                                                198/418.6
7,077,558 B2 * 7/2006 Bodenstorfer ........ A21C 5/02
                                                366/76.7

FOREIGN PATENT DOCUMENTS

| DE | 102008000730 A1 | 9/2009 |
|----|-----------------|--------|
| GB | 2 237 177       | 5/1991 |
| WO | 2003051127 A1   | 6/2003 |

* cited by examiner

TRANSFER APPARATUS FOR DOUGH PIECES

CROSS-REFERENCES TO RELATED APPLICATIONS

This application claims the priority of German Patent Application, Serial No. 10 2017 202 706.1, filed Feb. 20, 2017, pursuant to 35 U.S.C. 119(a)-(d), the content of which is incorporated herein by reference in its entirety as if fully set forth herein.

FIELD OF THE INVENTION

The present invention relates to a transfer apparatus for dough pieces to transfer said dough pieces from a first processing station to the next, as it is especially used for transferring dough pieces from a dough portioning device to a dough kneading device. Other application sites in baking systems can involve, for example, rotary slides, sub-drums, slide boxes, cutting and laminating lines for dough processing.

BACKGROUND OF THE INVENTION

It is well-known that such transfer apparatuses have a rotating dropping roller, also called release roll or release shaft, for releasing the dough pieces from the outgoing processing station, as well as a scraper associated with the dropping roller to support the release of the dough piece from the dropping roller.

In prior art, such transfer apparatuses for dough pieces are described. In this connection, the tendency that the dough pieces results in a sticky dropping roller despite the scraper, especially when working with a soft, sticky dough, poses a problem. This interferes with a reliable, trouble-free operation of the transfer apparatus.

In general, baking systems operate with oiled rollers, but only for the purpose of oiling the dough pieces. For example, DE 2939818 C2 and DE 33 20 210 C2 show respective systems, in which oil applicator rollers are arranged at the transport path of dough pieces and apply oil on the surface of the dough pieces when they are passing by.

DE 29 43 088 A1 discloses a dough dividing and kneading machine with a final oil application, in which oil is sprayed out of nozzles directly on the dough pieces.

WO 03/051 127 A1 describes a device for the continuous production of a dough sheet.

DE 10 2008 000 730 A1 describes a dough portioning device in a hopper for receiving a dough mass.

SUMMARY OF THE INVENTION

The present invention is based on the objective of improving a transfer apparatus for dough pieces in such a way that effectively prevents the dropping roller from becoming sticky.

According to an aspect of the invention, a transfer apparatus for transferring a dough piece from first processing station to the next includes a rotating dropping roller that is configured to release the dough piece from the first processing station, and a scraper that is associated with the dropping roller and that is configured to support the dough piece released from the dropping roller. An oiling device is associated with the dropping roller and is configured to apply oil on an outside surface of the dropping roller.

By applying oil in such a way, the surface of the dropping roller becomes less adhesive for the dough, thus drastically reducing the tendency for causing the dropping roller to become sticky. The oiling device can comprise a unit which produces an oil mist by means of ultrasonic atomization, which oil mist precipitates on the outside of the dropping roller. The oiling device can comprise at least one spray can comprise at least one spray can. It is also possible that said oiling device comprises a plurality of such oil spray cans. The dropping roller can be mounted in detachable manner inside the transfer apparatus, as well as inside a dough processing system comprising the dough portioning device and the dough piece kneading device. The fact that the dropping roller can be detached facilitates the cleaning process of the roller and is beneficial for the installation environment of the roller. This is especially advantageous when processing soft doughs. In addition, it can be ensured that it is possible to operate the upstream dough portioning device and the downstream dough piece kneading device also when the dropping roller is removed, which can be especially advantageous when processing larger dough portions. The possibility of removing the dropping roller also facilitates the dead space accessibility of the installation environment of the dropping roller.

The oiling device can comprise at least one oiling pipe, which extends at a distance parallel to the rotational axis of the dropping roller and has oil outlet openings distributed across its length. This is a constructionally simple realization of the oiling device.

To convey the oil to the oiling device with the least possible technical effort, it is advantageous that the oiling pipe is arranged above the dropping roller. Then the oil is delivered unpressurized via the oil outlet openings and drips contingent on gravitation on the dropping roller. Therefore, it is sufficient to convey the oil to the oiling pipe via a simple pump device.

According to a further embodiment, the oil outlet openings can be arranged at the upper side of the oiling pipe facing away from the dropping roller to provide a unified flow of the released amount of oil. As a result, the oil is distributed across the surface of the pipe before dripping off in the direction of the dropping roller, thus achieving the equalizing effect.

In an alternative embodiment of the invention, the oil outlet openings can be configured in the form of nozzles, by means of which the oil can be sprayed under pressure on the dropping roller. Although this requires a more complex pumping device, a dosed spray rate can result in an even more uniform and particularly thin oil film on the dropping roller, which reduces the oil demand. This can be also advantageous in the event that an indirect oiling of the dough pieces should be as low as possible.

To simplify maintenance and especially cleaning procedures at the transfer apparatus, it is advisable to mount the oiling pipe in detachable manner in the transfer apparatus. As a result, it can be simply dismounted, cleaned and reinstalled for frequently required cleaning purposes.

The same objective is achieved by connecting the oiling pipe via a plug connection to an oil supply line, as provided according to a further preferred embodiment of the invention.

An alternative to the oiling device arranged at a distance to the dropping roller is provided by implementing an oil-soaked transmission medium in the form of a fabric, felt or fleece at the dropping roller. This has the advantage that the surface of the dropping roller, to which the oil is applied, can be precisely defined and less oil mist can penetrate the remaining areas of the baking system.

According to a further development of the invention, the oiling device is definitely supplied with oil from an oil reservoir via a pump, dosing pump, dosing-valve arrangement or the like. This also results in a beneficial efficiency of the oiling process.

A further embodiment provides that the scraper edge of the scraper is positioned above a micro gap at a distance of between 10 μm and 100 μm, preferably 50 μm, to the dropping roller. This micro gap further supports the uniform distribution of the oil across the surface of the dropping roller.

Also disclosed is a method of transferring a dough piece a dough portioning device to a dough kneading device using a transfer apparatus and of oiling a rotating dropping roller of the transfer apparatus.

Further characteristics, details and advantages of the invention are included in the following description of an embodiment by means of the enclosed figures.

DETAILED DESCRIPTION OF THE PREFERRED EMBODIMENTS

Figure 1:
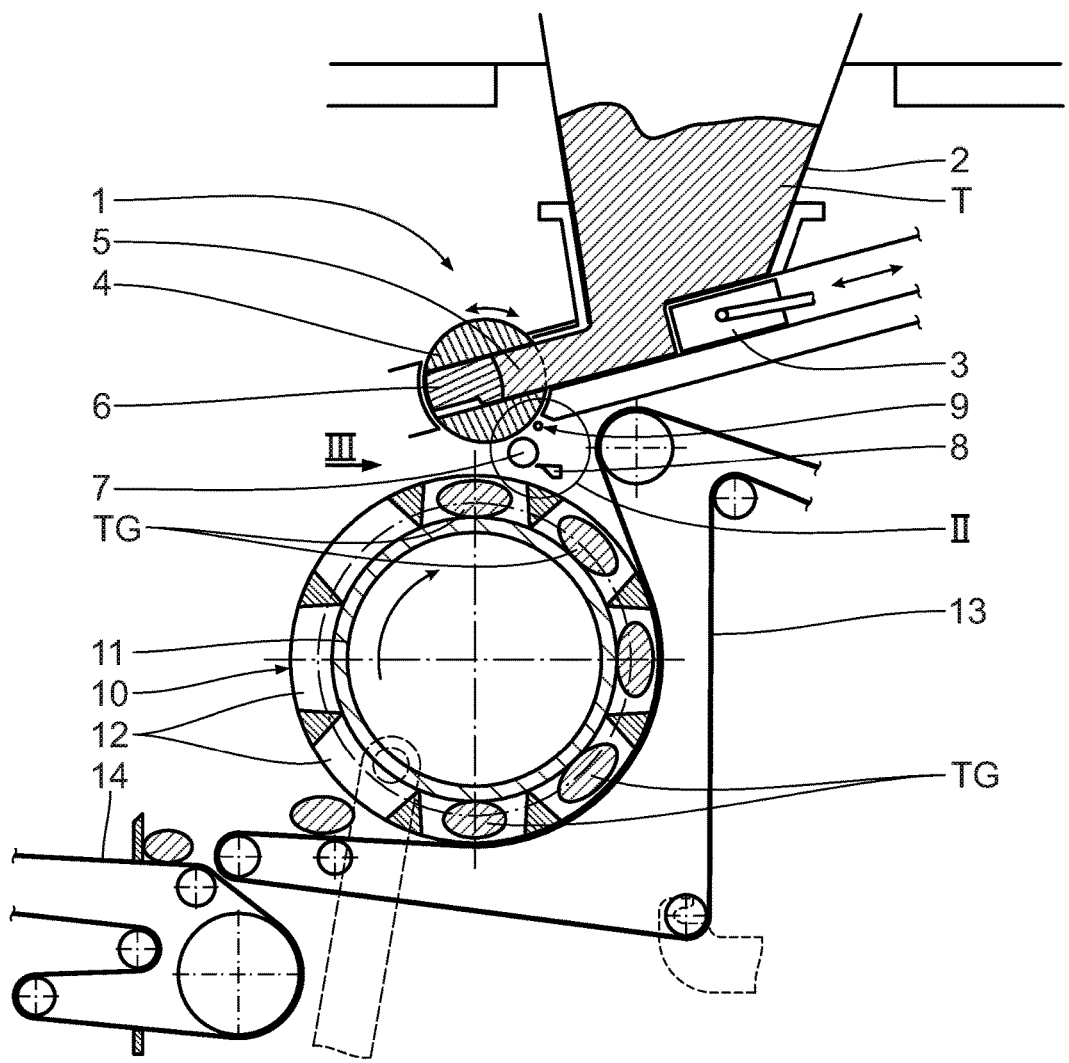
FIG. 1 shows a schematic lateral view of a dough processing system with a dough dividing apparatus, transfer apparatus and kneading drum.

As shown in FIG. 1, the dough processing system shown comprises a customary dough dividing apparatus 1 with a supply hopper 2 for the dough T, a slide 3 arranged below and a portioning drum 4. A partial quantity of the dough T is sheared off via the slide 3 and filled into a portioning chamber 5, which is located in the portioning drum 4 and limited by an ejector piston 6. By rotating the portioning drum 4 counter-clockwise in relation to FIG. 1, the portioning chamber 5 is brought into a turning position directed downward. At the same time, the ejector piston 6 is moved in radial direction, so that the dough piece TG located in the portioning chamber 5 is discharged downward.

To support the process of separating the dough piece TG from the ejector piston 6, a dropping roller 7 rotating counter-clockwise in relation to FIG. 1 is arranged below the portioning drum 4, next to the discharge position of the dough piece TG. The rotational axis R of said dropping roller 7 is aligned parallel to the rotational axis of the portioning drum 4. The dropping roller 7 affects the dough piece TG emerging from the portioning chamber 5 in such a way that it is detached from the ejector piston 6.

On the side dropping roller 7 facing away from the portioning drum 4, a scraper 8 is arranged parallel to the dropping roller 7, which scraper prevents the dropping roller 7 from becoming sticky. Furthermore, above the dropping roller 7 an oiling device 9 is provided, the detailed structure of which is described below in more detail by means of FIGS. 2 to 4.

The customary chamber drum 10 of the dough processing system is arranged below the portioning drum 4 and the dropping roller 7. Said dough processing system has an internal kneading drum 11, kneading chambers 12 distributed across its circumference, as well as a kneading belt 13 extending across a partial circumference of the chamber drum 10. After being detached from the portioning drum 4, one dough piece, respectively, falls into the kneading chambers 12. While the kneading drum 10 is rotating clockwise in relation to FIG. 1, each dough piece TG is subjected to a customary kneading process. Afterwards, each dough piece is transported individually via the discharge conveyor to the next processing station.

Subsequently, the oiling device 9 is described in more detail by means of FIGS. 2 to 4. Said oiling device 9 has an oiling pipe 15 arranged at a distance a of the above the dropping roller 7, parallel to its rotational axis R. Said oiling pipe 15 extends across the entire length of the dropping roller 7 and is connected via a plug connection 16 to an oil supply line 17. The oiling pipe 15 is mechanically supported via said plug connection 16 and connected for fluid supply via the oil supply line 17 to an oil reservoir 18 shown as a diagram in FIG. 2. The oil located in the oil reservoir 18 is supplied in a defined quantity via a dosing pump 19 to the oiling pipe 15. Due to the plug connection, the oiling pipe 15 can be dismounted efficiently, for example, to perform maintenance and cleaning procedures.

Figure 2:
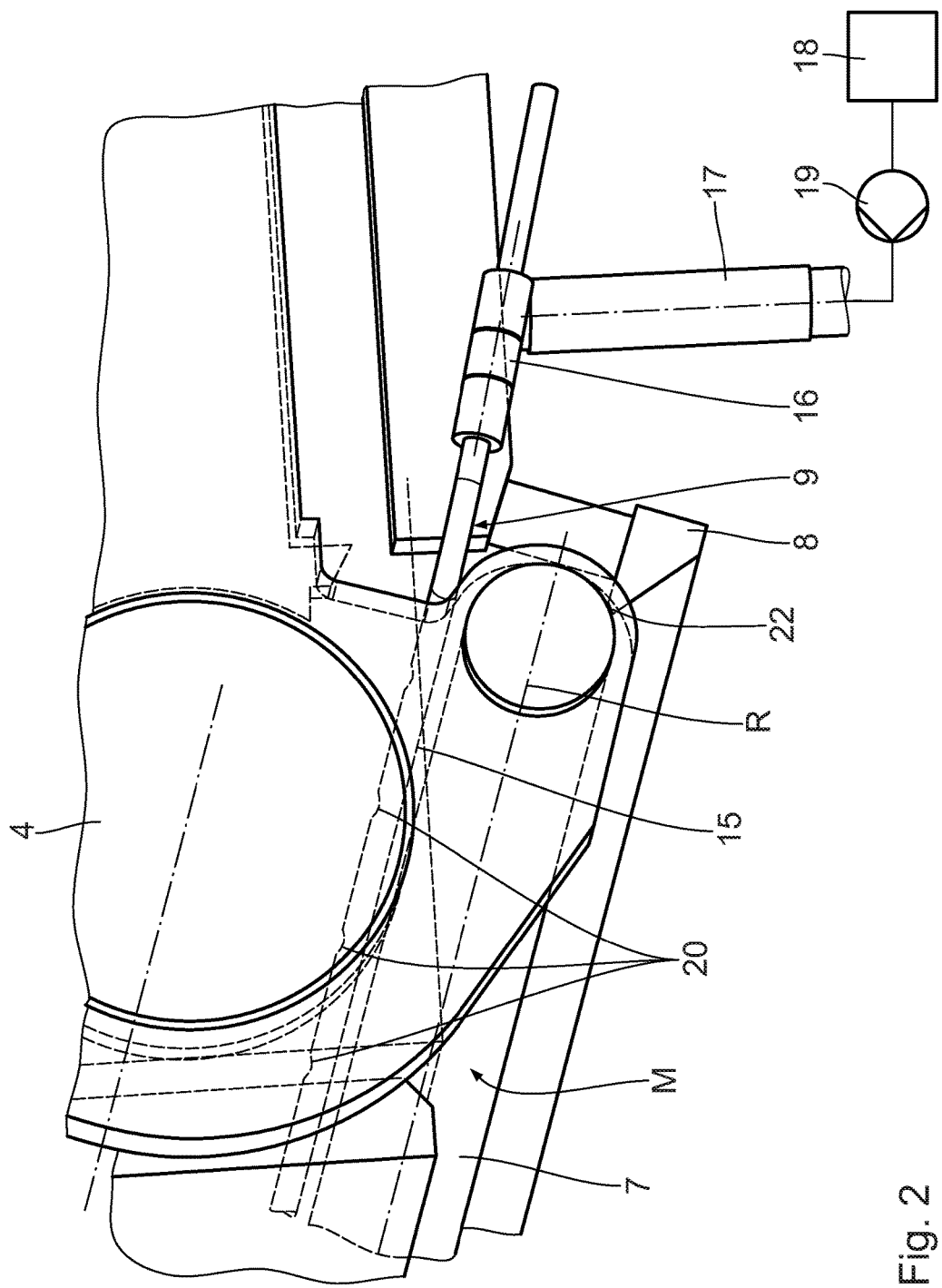
FIG. 2 shows a schematic perspective view of area II according to FIG. 1.
Figure 3:
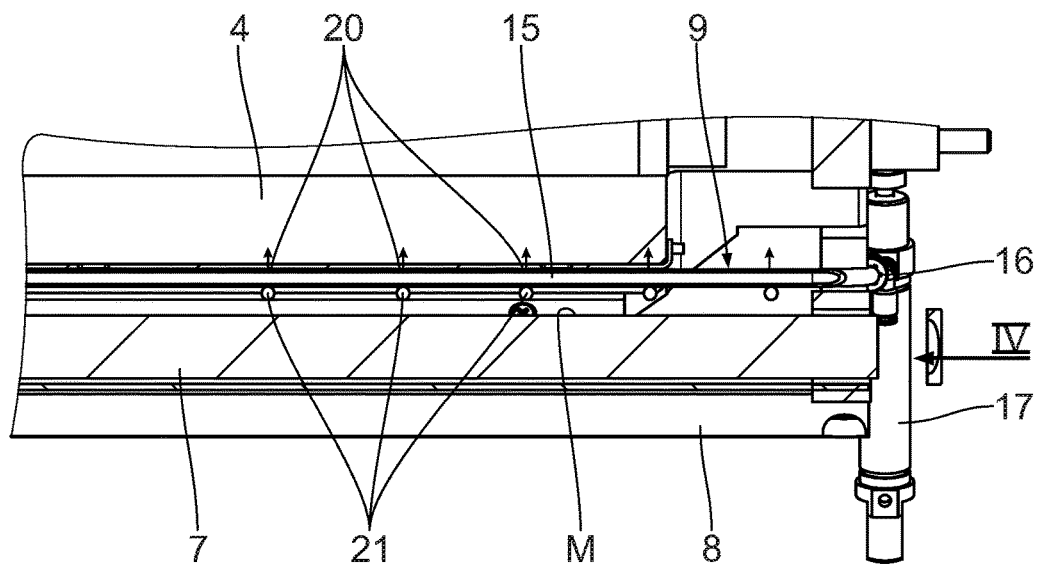
FIG. 3 shows a frontal view of the transfer apparatus from arrow direction III according to FIG. 1.
Figure 4:
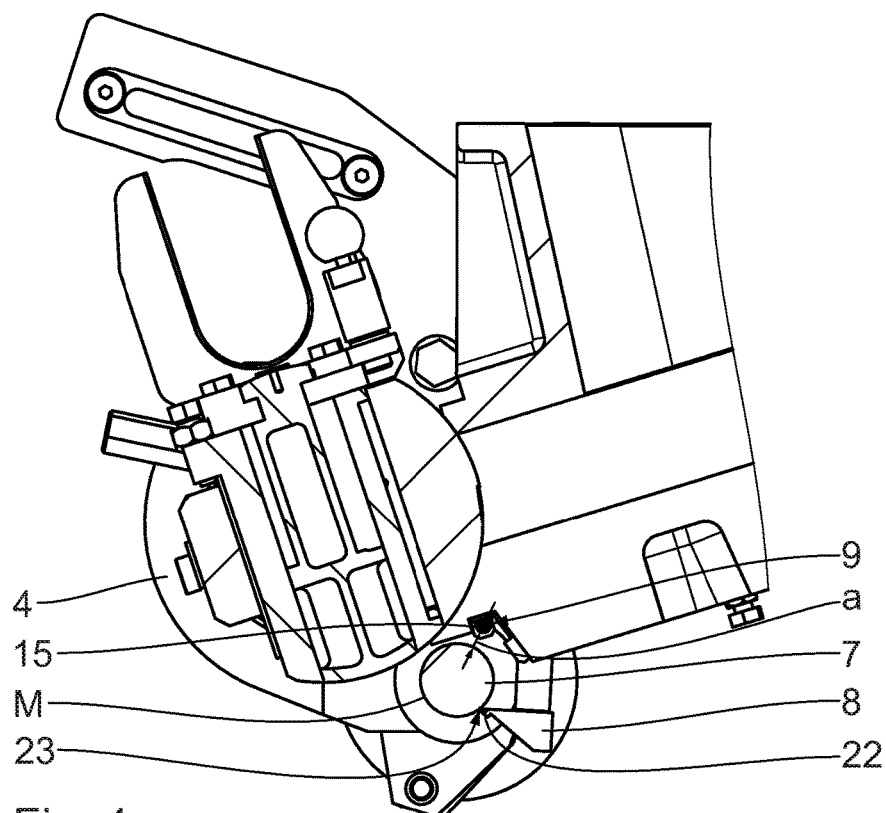
FIG. 4 shows a lateral view of the transfer apparatus from arrow direction IV according to FIG. 3.

As shown especially in FIGS. 2 and 3, said oiling pipe 15 has oil outlet openings 20 distributed across its length, which are inserted on the upper side of the oiling pipe 15 facing away from the dropping roller 7. The oil supplied by the dosing pump 19 is delivered unpressurized via the oil outlet openings 20 and drips contingent on gravitation on the outside surface M of the dropping roller 7. The respective drops 21 are symbolically indicated in FIG. 3. Due to its creep ability, the oil is then distributed on the dropping roller 7 and prevents dough of the dough pieces TG from sticking to the dropping roller 7.

The scraper edge 22 of the scraper 8 is arranged to face the dropping roller 7. In this context, it should be mentioned that a micro gap 23 with a measurement of, for example, 50 μm is provided between the edge 22 and the outside surface of the dropping roller 7, which gap is sufficiently small for an efficient abrasion of dough material. However, at the same time, said gap supports the uniformity of the oil film on the dropping roller 7.

What is claimed is:

1. A transfer apparatus for transferring a dough piece from a first processing station to a second processing station, comprising:
    a rotating dropping roller that is configured to release the dough piece from the first processing station, and
    a scraper that is associated with the dropping roller and that is configured to support the dough piece released from the dropping roller, and
    an oiling device that is associated with the dropping roller and that is configured to apply oil onto an outside surface of the dropping roller;
    wherein the oiling device comprises at least one oiling pipe which extends at a distance parallel to the rotational axis of the dropping roller and which has oil outlet openings distributed across an axial length thereof; and
    wherein the oiling pipe is arranged above the dropping roller with oil being delivered unpressurized via the oil outlet openings and dripping by gravity onto the dropping roller.

2. The transfer apparatus according to claim 1, wherein the oil outlet openings are arranged at an upper side of the oiling pipe that faces away from the dropping roller.

3. The transfer apparatus according to claim 1, wherein the oil outlet openings are configured in the form of nozzles via which the oil can be sprayed under pressure onto the dropping roller.

4. The transfer apparatus according to claim 1, wherein the oiling pipe is mounted in a detachable manner in the transfer apparatus.

5. The transfer apparatus according to claim 4, wherein the oiling pipe is connected via a plug connection to an oil supply line of an oil reservoir.

6. The transfer apparatus according to claim 1, wherein the oiling device is formed by one of a fabric, felt, and fleece attached to the dropping roller.

7. The transfer apparatus according to claim 1, wherein the oiling device is supplied with oil from an oil reservoir via one of a pump, a dosing pump, and a dosing-valve arrangement.

8. The transfer apparatus according to claim 1, wherein a scraper edge of the scraper is positioned above the dropping roller by a micro gap having a thickness of between 10 µm and 100 µm.

9. The transfer apparatus according to claim 8, wherein the micro gap has a thickness of 50 µm.

10. The transfer apparatus according to claim 1, wherein the first processing station is a dough portioning device and the second processing station is a dough kneading device.

11. A method of transferring a dough piece from a first processing station to a second processing station, the method comprising:
rotating a dropping roller to release the dough piece from the first processing station,
supporting the dough piece that is released from the dropping roller on a scraper, and
applying oil on an outside surface of the dropping roller;
wherein the applying step comprises delivering oil from outlet openings in an oiling pipe which extends at a distance parallel to the rotational axis of the dropping roller, the oil outlet openings being distributed across an axial length of the oiling pipe;
wherein the oiling pipe is located above the dropping roller; and
wherein the applying step comprises allowing oil to fall by gravity onto the dropping roller from the oil outlet openings in the oil pipe.

12. The method according to claim 11, wherein oil is applied to the dropping roller from one of a fabric, felt, and fleece attached to the dropping roller.

13. The method according to claim 11, wherein the first processing station is a dough portioning device and the second processing station is a dough kneading device.

14. A method of transferring a dough piece from a first processing station to a second processing station, the method comprising:
rotating a dropping roller to release the dough piece from the first processing station,
supporting the dough piece that is released from the dropping roller on a scraper, and
applying oil on an outside surface of the dropping roller;
wherein the applying step comprises delivering oil from outlet openings in an oiling pipe which extends at a distance parallel to the rotational axis of the dropping roller, the oil outlet openings being distributed across an axial length of the oiling pipe;
wherein the oil outlet openings in the oiling pipe comprise nozzles; and
wherein applying step comprises spraying oil under pressure onto the dropping roller from the nozzles.

* * * * *